United States Patent [19]

Förster et al.

[11] 4,376,627
[45] Mar. 15, 1983

[54] BURNER ASSEMBLY WITH PARALLEL PASSAGES FOR FUEL AND OXIDIZING GAS

[75] Inventors: Siegfried Förster, Alsdorf; Manfred Kleemann, Bergheim; Peter Quell; Berthold Sack, both of Aachen, all of Fed. Rep. of Germany

[73] Assignee: Kernforschungsanlage Jülich GmbH, Jülich, Fed. Rep. of Germany

[21] Appl. No.: 134,797

[22] Filed: Mar. 28, 1980

[30] Foreign Application Priority Data

Mar. 29, 1979 [DE] Fed. Rep. of Germany ....... 2912517
Mar. 29, 1979 [DE] Fed. Rep. of Germany ....... 2912518

[51] Int. Cl.³ .................. F24C 3/10; F23D 13/12
[52] U.S. Cl. .................... 431/192; 431/263; 431/328; 239/555
[58] Field of Search ............ 431/193, 192, 263, 260, 431/328, 326, 354, 217, 181, 164, 7, 170; 165/165, 166; 239/418, 568, 555, 145

[56] References Cited

U.S. PATENT DOCUMENTS

| 742,879 | 11/1903 | Lawler | 431/328 |
| 3,556,701 | 1/1971 | Momoda et al. | 431/181 |
| 3,635,651 | 1/1972 | Desty | 431/328 |
| 3,650,661 | 3/1972 | Laguinia | 431/328 |

FOREIGN PATENT DOCUMENTS 1182949 3/1970 United Kingdom ............... 431/328

Primary Examiner—Samuel Scott
Assistant Examiner—Randall L. Green
Attorney, Agent, or Firm—Karl F. Ross; Herbert Dubno

[57] ABSTRACT

Burners operating with combustion air as the combustion-sustaining gas and a fuel, generally a vaporizable liquid fuel, have at least one ceramic body formed with passages for these two fluids allowing heat exchange through the walls separating these passages. According to the invention, these walls are porous so that fuel in the fuel passage can traverse the wall into an adjoining air passage by evaporation on the surface. The combustion air can be heated by recuperative heat exchange from exhaust gases of the combustion chamber. Burner heads of this type can be paired in mirror-symmetrical relationship.

6 Claims, 10 Drawing Figures

BURNER ASSEMBLY WITH PARALLEL PASSAGES FOR FUEL AND OXIDIZING GAS

CROSS-REFERENCE TO RELATED APPLICATION

The present application is related to the commonly assigned copending application Ser. No. 100,634 filed Dec. 5, 1979, and allowed, and in which some of the present inventors are named as joint applicants. This related application is included in its entirety herein by reference.

FIELD OF THE INVENTION

Our present invention relates to burner heads for industrial and like furnaces and, more particularly, to burner heads of the type in which an oxidizing agent, namely, combustion air, is preheated prior to entry into the combustion chamber and, in turn, preheats the fuel.

In particular this invention relates to improvements in the burner head and furnace systems of the aforementioned copending application and is especially designed for use with the systems described and claimed in that application.

BACKGROUND OF THE INVENTION

As has been pointed out in the aforementioned copending application and as will be apparent from the German patent document (printed application—Auslegeschrift) DE-AS No. 2347 934, it is already known to provide ceramic burner heads with parallel passages through which the fuel and the combustion sustaining air can be passed to the combustion chamber in which the two fluids mix and are ignited to sustain combustion and thus generate industrially or otherwise usable energy. The advantage of a ceramic burner head of the aforedescribed type is that it can also serve as a recuperative heater for the fluids introduced into the combustion chamber (see German patent document—open application—Offenlegungsschrift DE OS No. 06 27 043).

In this system the gas mixture of the fuel gas and the oxidizing agent, prior to entry into the combustion chamber, is contacted with a recuperatively heated surface whose temperature has been raised by contact with or conduction from exhaust gases generated in the combustion chamber and in the course of discharging such gases from the combustion chamber.

In connection with burner heads for the purposes described, mention may also be made of the high-output burner head described in German patent document (printed application—Auslegeschrift) DE-AS No.20 44 813. In this head a plurality of parallel flow passages of the fuel gas and the oxidizing medium are disposed adjacent one another so that the flow passages of the oxidizing medium are surrounded by the flow passages for the fuel.

In, for example, German patent document (Open application—Offenlegungsschrift) DE-OS No. 24 08 542, preheating of the combustion air is described before the combustion air is mixed with the fuel gas in a system in which the combustion air acts as a coolant for metal walls of the combustion chambers. While this system provides an increased efficiency, it is frequently desirable to heat the fuel as well before it is mixed with the oxidizing agent for the reasons stated above.

This effectively represented the state of the art prior to the system developed by some of us and described in the aforementioned copending U.S. application. In that system the ceramic burner head was formed with passages for the separate supply of fuel agents and an oxidizing agent to the combustion chamber via a plurality of mutually parallel and adjacent passages, opening into the combustion chamber for the fuel and the combustion air.

The flow passages had an elongated cross section (preferably rectangular with the length of the cross section many times greater than the width) and the flow cross sections were closed on opposites sides of the ceramic body by cover plates or walls. The flow passages were offset from one another so that a partition was formed in the ceramic burner body between each pair of neighboring passages to enable indirect heat exchange between the oxidation gas or combustion air and the fuel. In the preferred construction of the system, part of the length of each combustion air passage was paralleled by a passage for the exhaust gas (hot combustion gas) so that the combustion air was first heated by recuperative heat exchange and then transferred heat to the fuel by indirect heat exchange through the partitions.

When ceramic burner heads of the earlier designs, and even of the latter application, are provided in industrial furnaces or even as low-power energy procedures for other purposes, one may wish to make use of liquid fuels such as fuel oils.

In such cases it is desirable that the heat transferred from combustion air or oxidation fluid to the fuel be sufficient to vaporize the fuel before it emerges from the mouth of the burner.

However, various problems ensue. With prior art systems, and even the system described in the above identified copending U.S. application it is not possible to always avoid overheating of the fuel and a cracking thereof which produces detrimental residues which can block the flow passages of the burner head or give rise to deposits in the combustion chamber or in the exhaust gas passages.

It may also be mentioned that earlier systems having multiple passages for the fuel and oxidation agent, and even the systems of the copending U.S. application mentioned above, while highly effective for low power systems, may not be suitable for high-power furnace installations because of limited throughput which results from the desire to obtain an efficient mixing of the fluids and heat exchange between them.

OBJECTS OF THE INVENTION

It is an object of the present invention to improve upon burner heads of the type described in the aforementioned U.S. application so as to enable such burner heads to be used for liquid fuels and to permit operation of the burner without cracking of the liquid fuels and without producing deposits or the like which have plagued earlier systems utilizing liquid fuels.

It is another object of the invention to provide a system whereby the burner power can be increased utilizing principles described in the aforementioned copending U.S. application.

Still another object of our invention is to provide an improved ceramic burner head capable or operating with liquid fuels without the disadvantages of earlier systems and with an improved efficiency.

A further object of our invention is to provide a high-power burner system particularly suitable for large-scale furnaces.

SUMMARY OF THE INVENTION

These objects are attained, in accordance with the present invention, generally with burner head arrangements as described in the aforementioned copending U.S. application, but with some modifications as described below. Hence, in dealing with the modifications, it should be understood that the principles of the present invention are applicable to all of the embodiments described in this latter application and improve each of them so that they are able more effectively to utilize liquid fuels.

More specifically, we have found that when the partitions between the flow passages for the liquid fuel and the oxidation agent (fuel air) is so formed as to be permeable to the fuel in gaseous state, and that the ends of the combustion passages turned toward the combustion chamber are closed or at least partially constricted, the burner heads can be utilized effectively with liquid fuels.

Since the partitions between these passages are formed from a material which is permeable to the fuel such as a porous ceramic or a sintered metal, these partitions are wetted by a -agent passage. The oxidizing agent and the fuel, now in a gaseous state, mix in the oxidizer passages, i.e. before reaching the burner mouth.

Advantageously the liquid fuel penetrates the porous partition and spreads thinly upon the surfaces turned toward the oxidizing-agent stream. This spreading action corresponds to a wetting of the surface from which the oxygen-containing stream mixes with the fuel which readily vaporizes at the temperature of the oxygen-containing stream so that, in effect, the oxidizing agent and a fuel gas are mixed well upstream of the burner mouth.

The porous partition thus serves as a means of spreading the fuel in a thin film to avoid any droplet entrainment by the oxygen-containing stream.

The control of the feed of the oxidizing agent and the fuel, the latter by regulating the liquid pressure in the fuel passages, permits the maintenance of a superstoichiometric fuel/oxidizing agent mixture in the mixture appearing at the burner mouth.

According to the invention, the fuel flow passages, at the end of the ceramic body forming the burner mouth are closed by porous material as well.

For cold starting of the burner, we have found it to be advantageous to provide an igniting device which extends transversely to the flow passages at the burner mouth.

This igniting device can include a feed line for liquid fuel which extends beyond the ceramic body at the burner mouth and is provided with a porous head serving the function of providing a thin film along its exterior in the manner described. This film-generating body is provided with an electrically heated wire which can be inserted within a cavity of the head communicating with a homogenizing zone ahead of the burner mouth.

The fuel film formed combustible mixture in this cavity is readily ignited by the resistance wire and communicates the ignition to the homogenizing zone at which the fuel/air mixture emerging from the burner mouth is triggered. This arrangement permits a uniform ignition of the combustible mixture over the entire width of the burner mouth.

According to another aspect of the invention, a plurality of burner heads of this type are disposed in pairs mirror-symmetrically and such that the burner mouths of the parallel-connected burners lie opposite one another.

Furthermore, a plurality of such burner pairs may be provided so that the burners are arranged in a honeycomb configuration.

BRIEF DESCRIPTION OF THE DRAWING

The above and other objects, features and advantages of the present invention will become more readily apparent from the following description, reference being made to the accompanying drawing in which.

SPECIFIC DESCRIPTION

In the description below, reference will be made to the use of porous partitions between the fuel passages and the air passages of a burner, for the purpose of forming liquid-fuel films which readily evaporate into the air stream and thus produce a fuel/air gaseous mixture without entrainment of any droplets with the mixture. Such partitions can be used in all of the burner heads subsequently described. Similarly, specific mouth constructions for burner heads are described in particular applications although it should be noted that any of the mouthpiece configurations can be used for any of the burners according to the present invention. The same applies to the ignition device and mention should also be made that the assembly of a plurality of burners for higher capacity, shown in FIGS. 7 through 10, is applicable to the burners of FIGS. 1 and 2 as well although the burners of FIGS. 7 through 10 do not necessarily require the porous partitions of the burners of FIGS. 1 and 2.

Basically, however, each individual burner can consist of a generally rectangular parallepipedal ceramic block in which two sets of parallel grooves are formed. The two sets of grooves, each of which has an elongated rectangular flow cross section, interdigitate with one another so that partitions are formed between the grooves of the two sets (see application Ser. No. 100,634). As pointed out in this latter application, a recuperative heating effect can be provided so that heat from the combustion or exhaust gases from the combustion chamber can be transferred to the air by direct heat exchange through such partitions with the heated air thereupon heating the fuel. In the system of the present invention, fuel heating is effected indirectly through the partitions and directly by contact of the heated air with the fuel film.

Figure 1:
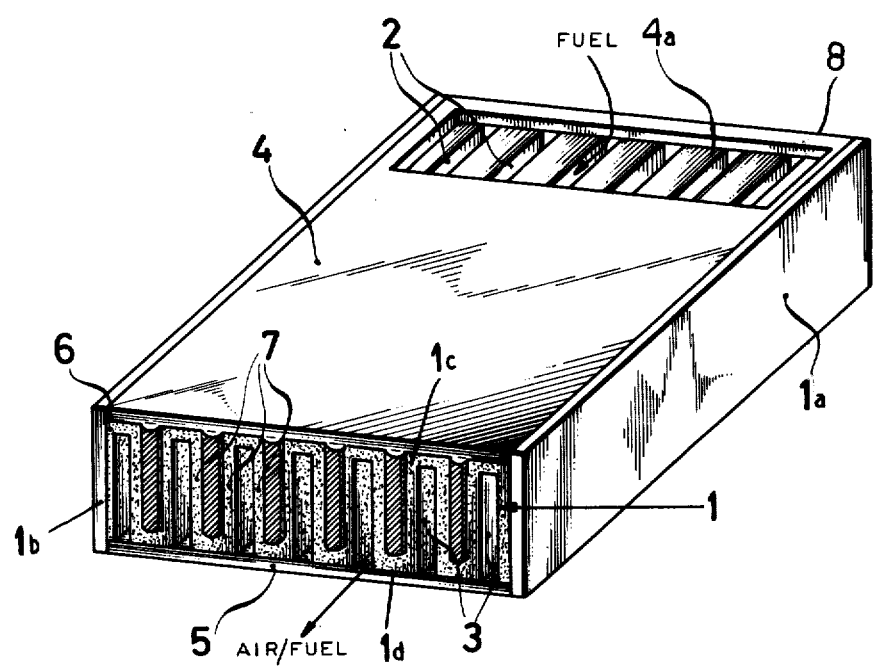
FIG. 1 is a diagrammatic perspective view of a burner head provided with porous partitions between the flow passages for the liquid fuel and an oxidizing agent which, for convenience, will hereinafter be described simply as air.

Thus in FIG. 1 we have shown a burner head which comprises a ceramic body 1 flanked by lateral ceramic plates 1a and 1b as well as upper and lower cover plates 4 and 5 of ceramic material.

Flow passages 2 are provided to open at the upper side 1c of the body 1 while grooves 3 open at the lower side 1d of this body do that the two sets of parallel grooves interdigitate with one another.

Each of the flow passages itself is of rectangular cross section and is rectilinear with a width of more than 1 mm.

These flow passages extend to the burner mouth 6 and each pair of flow passages separated by a partition 7 between them is offset toward opposite sides of the body 1. Thus indirect heat exchange can be effected through the partition.

The wall thickness of each partition 7 can be as low as about 0.4 mm.

The plates 4 and 5 can be provided with cutouts or openings 4a which can be offset from one another. These openings permit air and fuel to be fed to the passages 2 and 3 respectively.

The corresponding opening in plate 5 cannot be seen in FIG. 1 because of the direction in which the view is taken.

The rear end of the burner head 8 is closed and the front end forms the mouth 6. The passages 2 can deliver liquid fuel to the mouth while the air passes through the passages 3.

According to the invention, the partition walls 7 of the burner head are constituted of porous ceramic material permeable to the liquid fuel. The liquid fuel penetrating these partitions spreads in a thin film along the surfaces of the walls defining the passages 3 and, upon contact with the preheated air, readily evaporates to form an ignitable mixture of vaporized fuel and air. When the fuel is heating oil, the air should be heated to about 200° C.

The film-forming operation also prevents an overheating of the liquid fuel passage 2 and hence an undesired cracking thereof because of the cooling effect of evaporation.

For preheating of the air, which can be forced through the burner head by a blower not shown, we may make use of a recuperator as described in the copending application Ser. No. 135 082 filed March 28, 1980, and allowed, traversed by a heating medium such as the exhaust gas or combustion gas from the combustion chamber of the furnace.

The flow passages 2 for the fuel are closed by mouthpieces 9 which project beyond the burner mouth 6 and which are also composed of fuel-permeable porous ceramic material. On the external surfaces of these mouthpieces, therefore, fuel films are formed and evaporate in the preheated mixture at the mouth in the same manner as the film forming on the partitions 7.

Figure 2:
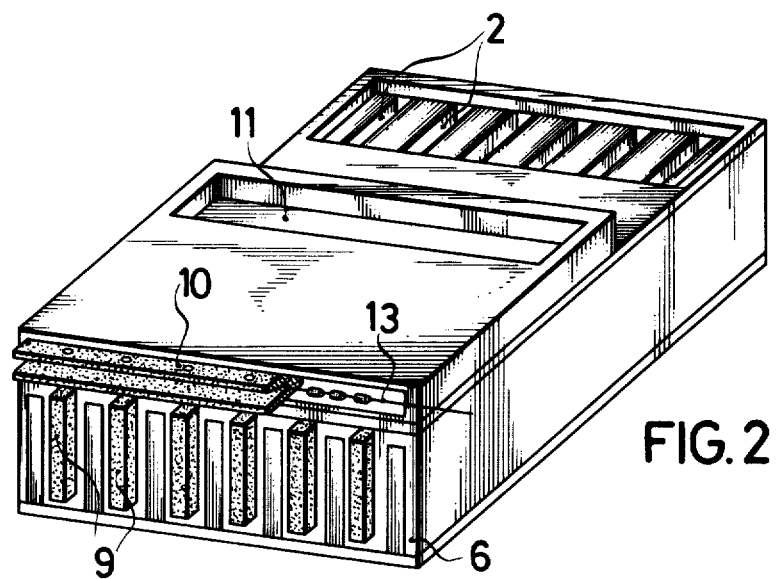
FIG. 2 is a diagram similar to FIG. 1, partly broken away, and illustrating the burner head provided with an igniting device.
Figure 3:
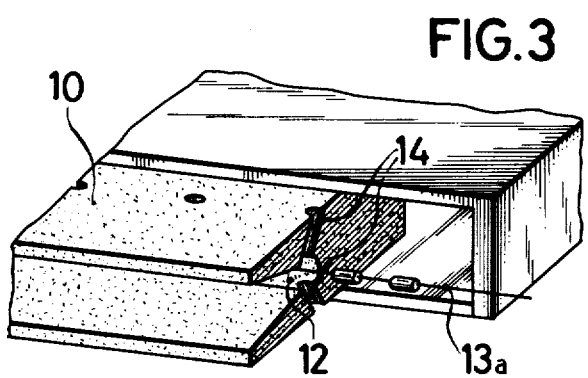
FIG. 3 is a perspective view, also partly broken away, of the igniting device drawn to a larger scale.

At the burner mouth 6, as can be seen from FIG. 2, an igniting device extends across all flow passages 2, 3 and again is provided in the form of a fuel-permeable film-producing body 10 which can be seen to have an upwardly upon V-shaped cavity 12 in which an ignition wire 13 (with spaced insulation beads 13a) is received (FIG. 3). The porous body 12 is provided at the end of a feed duct 11 for the fuel. The igniting wire 13 can be connected by a switch to a source of an electric current which heats this wire to ignite the combustible mixture formed along the surface of the cavity 12.

The resulting ignition flame is communicated via the bypass passages 14 to the mouths of the flow passages 3 to ignite the fuel/air mixture emerging at each of these passage into a homogenizing zone ahead of the burner mouth. When ignition has commenced the ignition wire is de-energized.

The passages 14 are provided to both sides of the body 10 so that ignition is uniformly effected at both burners of a pair when the latter are assembled as described in connection with FIG. 7.

Even when one burner is used, the additional bypass passages have been found to be advantageous for uniform distribution of the ignition to the combustible mixture.

Figure 4:
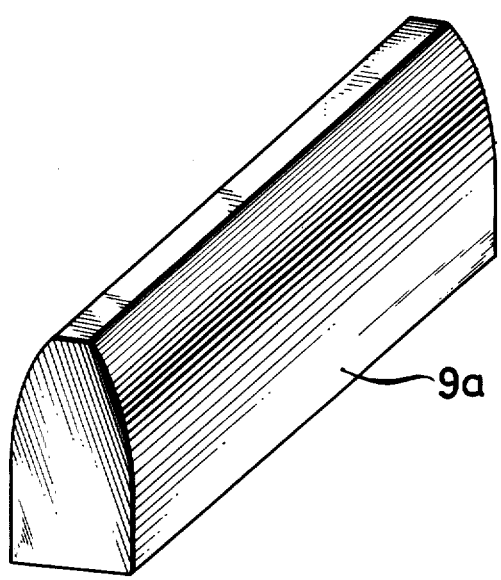
FIGS. 4 through 6 are perspective diagrams illustrating various configurations of mouthpieces for the burner of the present invention.
Figure 5:
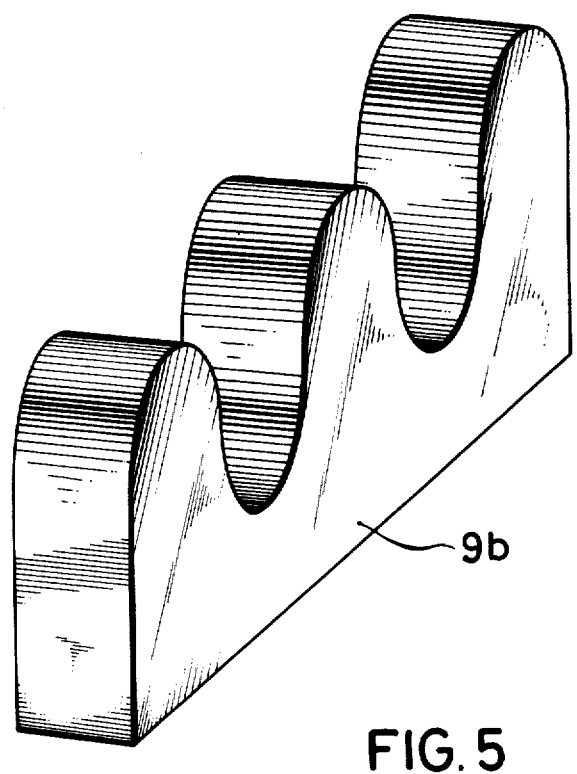
Figure 6:
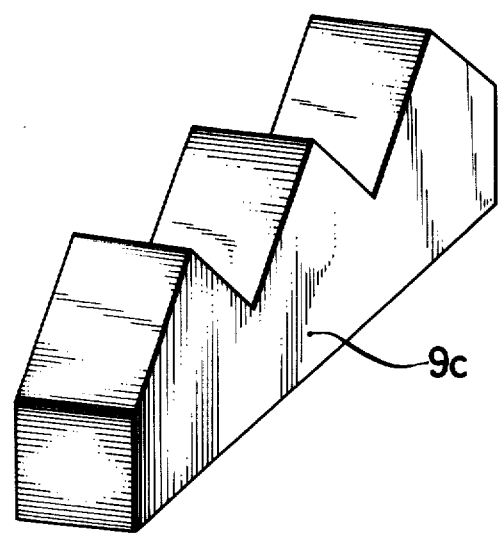

The configuration of the mouthpiece 9 blocking each fuel passage, determines the area over which the liquid film is formed and in FIG. 4, for example, the area is increased by making the flanks of the mouthpiece converge as shown at 9a. Dentate configurations increase the area still further (see mouthpieces 9b and 9c of FIGS. 5 and 6, respectively).

The burner head of the present invention has been found to allow combustion of fuel oils of various qualities without a cracking process within the fuel passages traversed by heavy fuel oil. The burner output can be adjusted over wide ranges with relatively little pressure change at the fuel passages.

Figure 7:
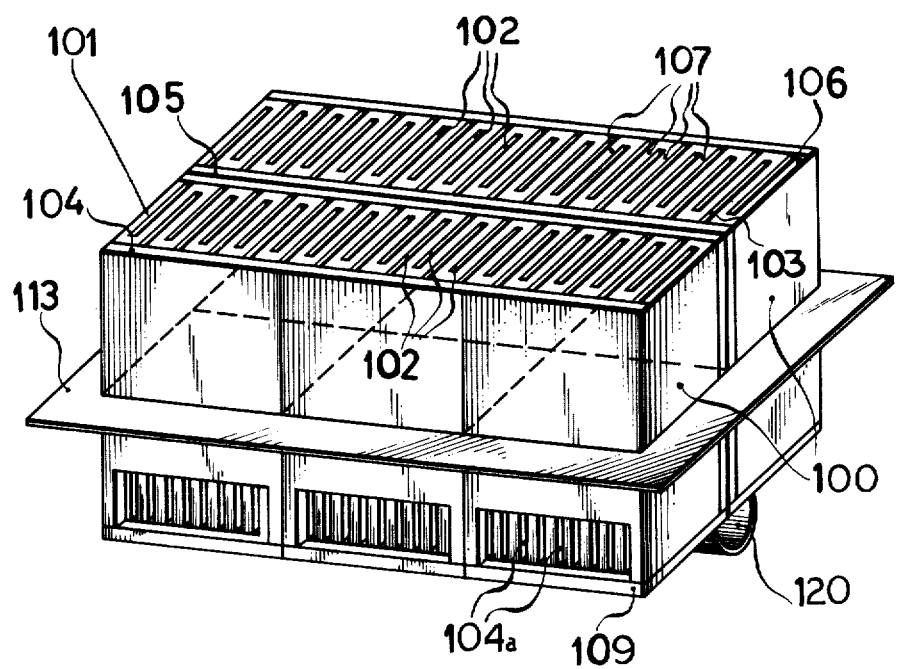
FIG. 7 is a perspective view of an assembly of six burner heads according to the invention disposed in mirror-symmetrically arranged pairs.

FIG. 7 shows an assembly comprising mirror-symmetrical pairs of burner units 100 of the type shown in FIGS. 1 and 2. As in the previously described embodiments, each of the burner heads comprises a ceramic body 101 with flow passages 102, 103 extending over the full length of the body and covered on opposite broad sides by the ceramic cover plates 104 and 105. The bodies, six of which are shown in FIG. 7, are disposed in mirror-symmetrical pairs so that their burner mouths 106 open on one side of the assembly and partitions 107 are located between the passages.

With these burner heads, as with that of FIGS. 1 and 2, the flow passages 102, 103 have elongated rectangular cross sections and are rectilinear with a width of more than 1 mm. Adjacent passages, separated by a common porous partition 107 of a wall thickness of down to 0.4 mm, are offset from one another toward opposite broad sides of the body.

The feed openings for the passages 2 are formed by cutouts 104a of the plates 4 and a closure plate 109 blocks the ends of the passages opposite the burner mouth 106. A gas seal is provided at 112.

Figure 8:
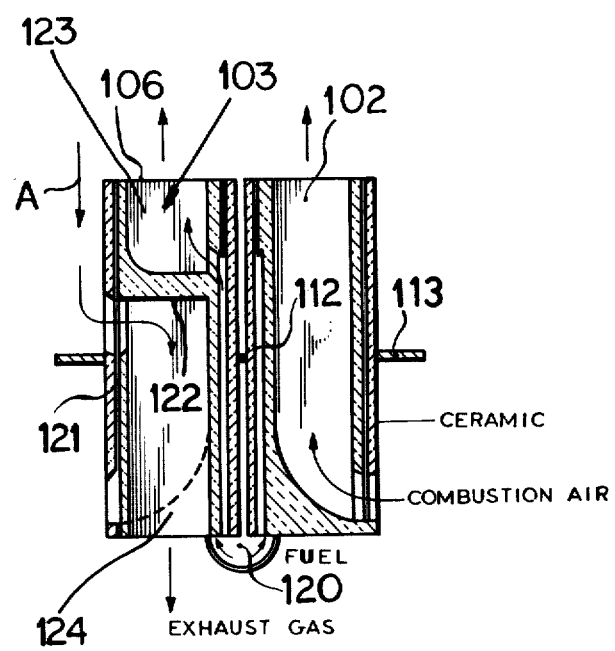
FIG. 8 is a cross-sectional view through a pair of mirror-symmetric burner heads having a recuperative heat exchanger (recuperator) upstream of the burner
Figure 9:
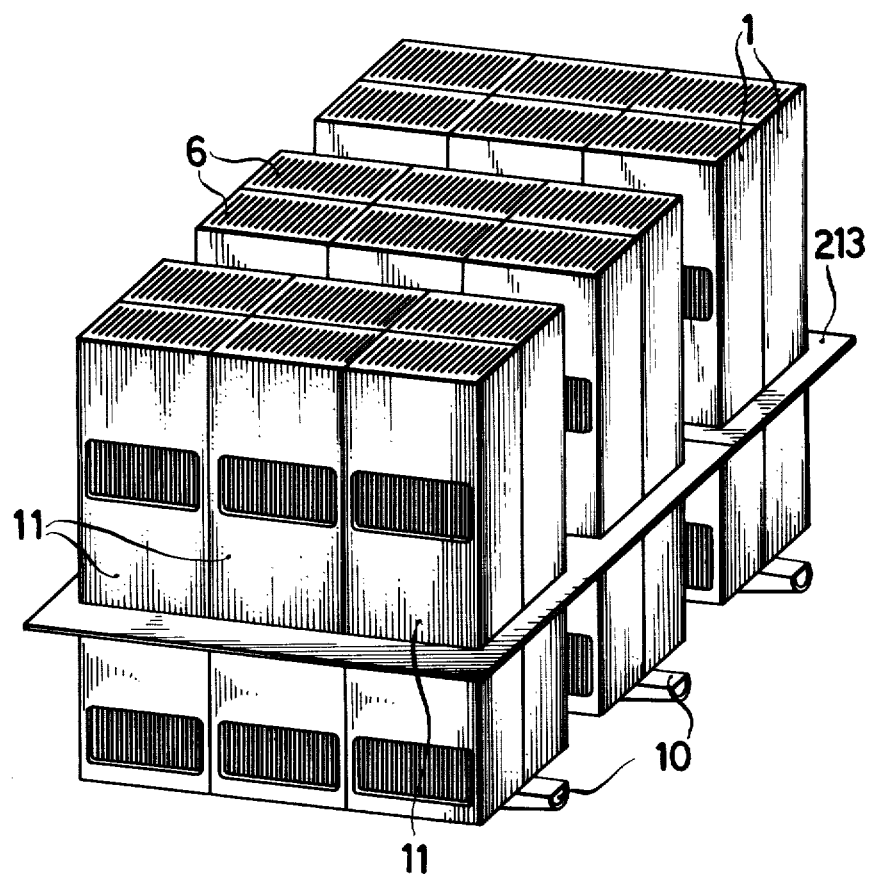
FIG. 9 shows how assemblies such as that of FIG. 7 can be combined for larger burner output in a perspective view.

As can be seen from FIG. 8, the plates 105 are provided with openings communicating with channels which are fed by the manifold duct 120, through which fuel is fed.

The air is supplied through passages 102 while the fuel flows into passage 103 and is discharged into the combustion chamber at the burner mouth 106 or forms a film on the partition 107 for evaporation into the air stream in the manner described. The system is also formed as a recuperator 121 (see application Ser. No. 100,634).

The recuperator 121 (FIG. 8) uses as a heating medium, a combustion gas (exhaust gas) withdrawn from the combustion chamber in the direction of arrows A and admitted to the passages 103 rearwardly of walls 122 which separate these passages into two section 123 and 124. In the section 123 the preheated air flowing through passages 102 of the common ceramic body are in indirect heat exchange with the fuel which also can pass through the partition 107 between the passages.

In the region 124, the partitions may be impervious to the fuel so that the exhaust gas only passes in indirect heat exchange with the air stream traversing adjacent passages.

In this case, as in Ser. No. 100,634, the heat of the combustion gases is transferred to the air which, in turn, heats and evaporates the fuel. As can be seen from FIGS. 7 and 9, burner pairs are provided in mirror-symmetrical relationship, the FIG. 9 construction utilizing burner pairs with recuperative heaters.

Several burner pairs are held together by common supports 113, 213.

The holders 113, 213 simultaneously form seals for the window in the combustion chamber wall into which the burner assemblies are inserted.

Figure 10:
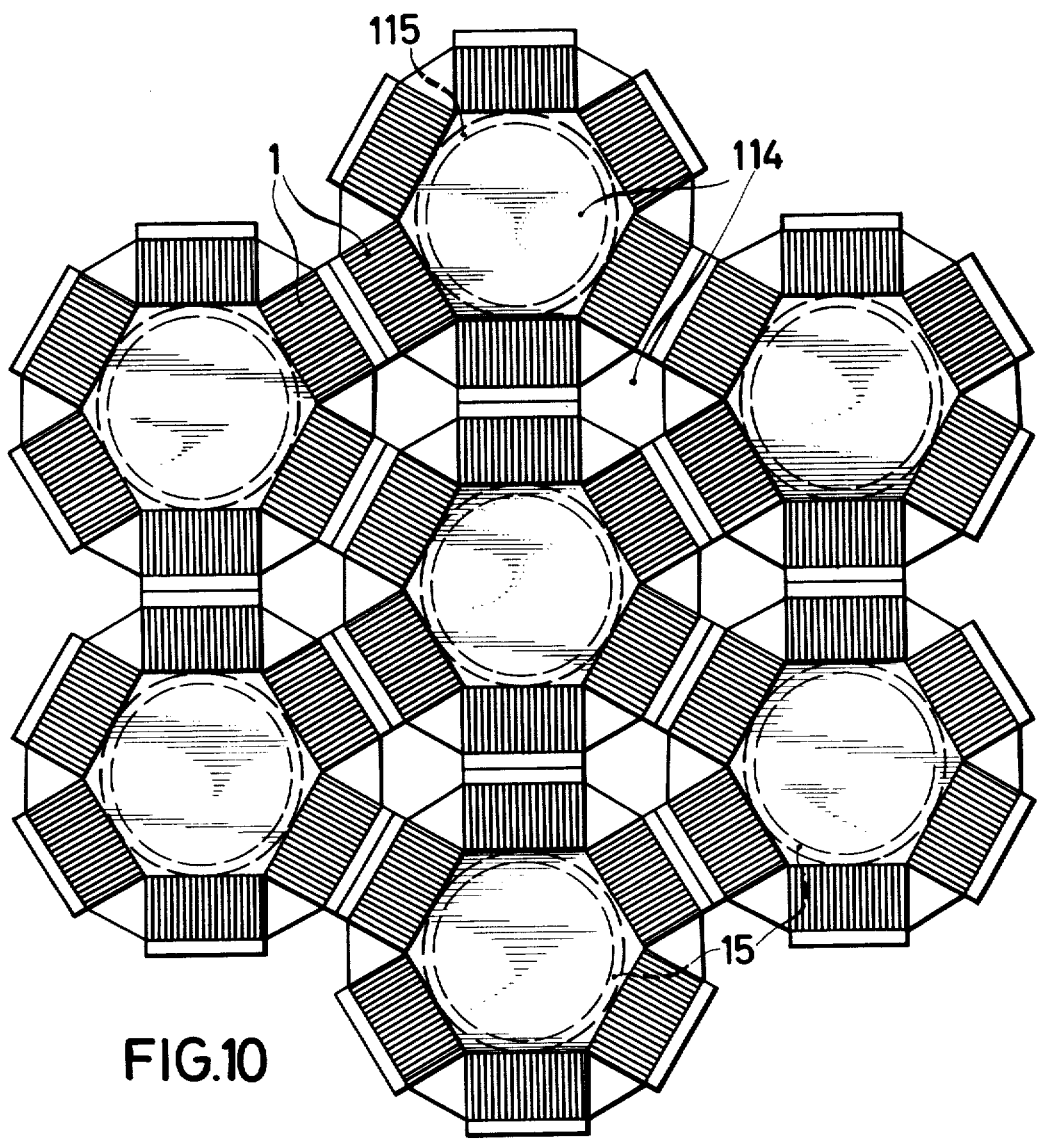
FIG. 10 is a diagram of burner pairs combined in a honeycomb structure.

In FIG. 10 the burner pairs are shown to be oriented in a honeycomb construction, the view being taken toward the mouths of the burner pairs. The spaces between the burner pairs shown at 114 are used to supply the fuel and holders 115 are provided to retain the burner pairs in a manner similar to that afforded by the holders 113, 213.

We claim:

1. A burner comprising at least one burner head formed with
   a ceramic body having two sets of interdigitated parallel passages, the passages of one of said sets opening at one end of said body at a burner mouth, the passages of said sets being separated from one another by liquid-fuel-permeable partitions whereby liquid fuel delivered to the passages of the other of said sets penetrates said partitions and forms a film on the walls of the passages of said one set;
   means for feeding an oxidizing agent gas through said passages of said one set for evaporation of said film to form a mixture with the fuel;
   means for supplying said fuel in liquid form to the passages of said other set; and
   an ignition device disposed at said mouth, said ignition device comprising
   an elongated porous body extending across said passages at said mouth and formed with a cavity,
   means for feeding liquid fuel to said elongated body whereby a film of the fuel is formed in said cavity,
   an ignition wire extending through said cavity and energizable for igniting the fuel film therein, and
   bores formed in said elongated body for communicating ignition to a combustible mixture ahead of said mouth.

2. The burner defined in claim 1 wherein the passages of said other set are closed at said mouth by liquid-permeable porous mouthpieces.

3. The burner defined in claim 2 wherein said mouthpieces have a dentate configuration.

4. The burner defined in claim 1 which has at least two such burner heads arranged in at least one mirror-symmetrical pair.

5. The burner defined in claim 4 wherein a plurality of mirror-symmetrical pairs of burner heads having their burner mouths adjacent one another are provided.

6. The burner defined in claim 5 wherein said pairs of burner heads are arranged in a honeycomb pattern.

* * * * *